United States Patent
Dong et al.

(10) Patent No.: US 10,124,301 B2
(45) Date of Patent: Nov. 13, 2018

(54) FILTRATION MATERIAL

(71) Applicant: INDUSTRIAL TECHNOLOGY RESEARCH INSTITUTE, Hsinchu (TW)

(72) Inventors: Rui-Xuan Dong, Taoyuan (TW); Shu-Hui Cheng, Zhubei (TW); Jen-You Chu, Hsinchu (TW); Yin-Ju Yang, Hsinchu (TW); Yi-Chun Lo, Zhudong Township (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 322 days.

(21) Appl. No.: 15/212,458

(22) Filed: Jul. 18, 2016

(65) Prior Publication Data
US 2017/0189865 A1    Jul. 6, 2017

(30) Foreign Application Priority Data

Dec. 31, 2015 (TW) ................ 10414467 A

(51) Int. Cl.
*B01D 71/64* (2006.01)
*B01D 69/12* (2006.01)
(Continued)

(52) U.S. Cl.
CPC ............. *B01D 71/64* (2013.01); *B01D 69/02* (2013.01); *B01D 69/12* (2013.01); *B01D 69/125* (2013.01);
(Continued)

(58) Field of Classification Search
None
See application file for complete search history.

(56) References Cited

U.S. PATENT DOCUMENTS

| 4,501,834 A | 2/1985 | Su |
| 6,663,775 B2 * | 12/2003 | Fukutomi ............ B01D 61/243 |
| | | 210/321.6 |

(Continued)

FOREIGN PATENT DOCUMENTS

| CN | 1147418 A | 4/1997 |
| CN | 101139501 A | 3/2008 |

(Continued)

OTHER PUBLICATIONS

Taiwanese Notice of Allowance and Search Report, dated Nov. 30, 2016, for Taiwanese Application No. 104144627.

*Primary Examiner* — Clare M Perrin
(74) *Attorney, Agent, or Firm* — Birch, Stewart, Kolasch & Birch, LLP

(57) ABSTRACT

The filtration material includes a supporting layer, a first selective layer disposed on the supporting layer, and a second selective layer disposed on the first selective layer. The first selective layer includes a polyimide and an ionic polymer intertwined with the polyimide. In particular, the polyimide includes at least one repeat unit having a structure represented by Formula (I)

Formula (I)

(Continued)

wherein $A^1$ is

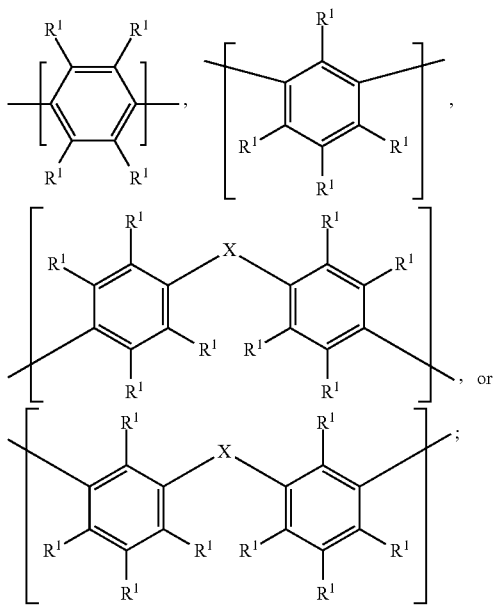

$A^2$ is

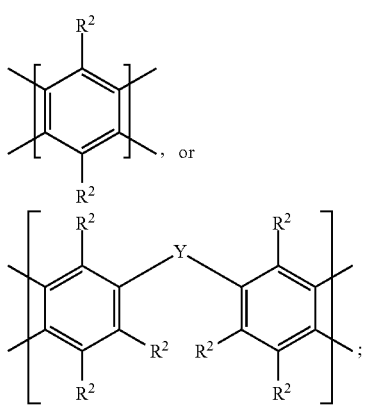

$R^1$ and $R^2$ are independently —H, —$CF_3$, —OH, —Br, —Cl, —F, $C_{1-6}$ alkyl group, or $C_{1-6}$ alkoxy group; and X and Y are independently single bond, —O—, —$CH_2$—, —$C(CH_3)_2$—, or —NH—.

16 Claims, 2 Drawing Sheets

(51) Int. Cl.
| | |
|---|---|
| *B01D 71/82* | (2006.01) |
| *C02F 1/44* | (2006.01) |
| *B01D 69/02* | (2006.01) |
| B01D 69/10 | (2006.01) |
| B01D 71/56 | (2006.01) |
| C08G 73/10 | (2006.01) |
| B01D 39/16 | (2006.01) |
| C02F 101/10 | (2006.01) |
| C02F 103/04 | (2006.01) |
| C02F 103/08 | (2006.01) |

(52) U.S. Cl.
CPC ............... *C02F 1/44* (2013.01); *C02F 1/442* (2013.01); *C02F 1/444* (2013.01); B01D 39/1623 (2013.01); B01D 69/10 (2013.01); B01D 71/56 (2013.01); B01D 71/82 (2013.01); B01D 2323/39 (2013.01); B01D 2325/04 (2013.01); B01D 2325/14 (2013.01); B01D 2325/16 (2013.01); B01D 2325/22 (2013.01); C02F 2101/101 (2013.01); C02F 2103/04 (2013.01); C02F 2103/08 (2013.01); C08G 73/10 (2013.01)

(56) References Cited

U.S. PATENT DOCUMENTS

| | | | |
|---|---|---|---|
| 6,743,273 B2 | 6/2004 | Chung et al. | |
| 2005/0051487 A1* | 3/2005 | Koslow | A61L 2/0017 |
| | | | 210/649 |
| 2008/0149561 A1 | 6/2008 | Chu et al. | |
| 2009/0078640 A1 | 3/2009 | Chu et al. | |
| 2010/0200512 A1* | 8/2010 | Chase | B01D 17/045 |
| | | | 210/708 |
| 2010/0219123 A1 | 9/2010 | Chen et al. | |
| 2010/0288692 A1 | 11/2010 | Kakzau | |
| 2011/0005990 A1* | 1/2011 | Schmitz | B01D 39/2017 |
| | | | 210/243 |
| 2011/0163035 A1 | 7/2011 | Cheng et al. | |
| 2013/0168312 A1 | 7/2013 | Chen et al. | |
| 2014/0076797 A1* | 3/2014 | Jo | B01D 39/1623 |
| | | | 210/505 |
| 2015/0141711 A1 | 5/2015 | Chu et al. | |

FOREIGN PATENT DOCUMENTS

| | | |
|---|---|---|
| CN | 101910249 A | 12/2010 |
| TW | 201440883 A | 11/2014 |
| TW | 201514007 A | 4/2015 |

\* cited by examiner

FILTRATION MATERIAL

CROSS REFERENCE TO RELATED APPLICATIONS

The application is based on, and claims priority from, Taiwan Application Serial Number 104144627, filed on Dec. 31, 2015, the disclosure of which is hereby incorporated by reference herein in its entirety.

TECHNICAL FIELD

The disclosure relates to a filtration material, and in particular to a filtration material suitable for use at high temperature.

BACKGROUND

With increased concerns over the maintenance of water resources, functional filtration materials have rapidly become the focus of attention in relevant industries.

Conventional filtration material, however, exhibits a poor rejection rate and flux when filtrating a solution (especially used in chemical, textile, food, paper pulp, or biochemical industries) under high temperatures due to the poor characteristics (such as low thermal resistance) of the conventional filtration material, resulting in inferior filtration capacity.

Accordingly, there is a need to develop a novel filtration material, which can be operated at relatively low pressure and high temperature, having a high rejection rate, and a high water flux.

SUMMARY

According to embodiments of the disclosure, the disclosure provides a filtration material including a supporting layer; a first selective layer disposed on the supporting layer; and a second selective layer disposed on the first selective layer. In particular, the first selective layer consists of a polyimide and an ionic polymer intertwined with the polyimide, wherein the polyimide includes at least one repeat unit having a structure represented by Formula (I)

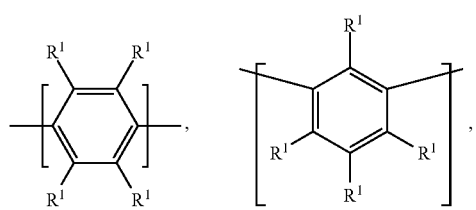

Formula (I)

wherein $A^1$ is

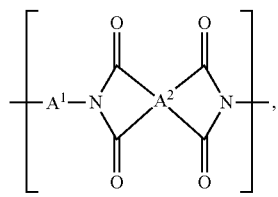

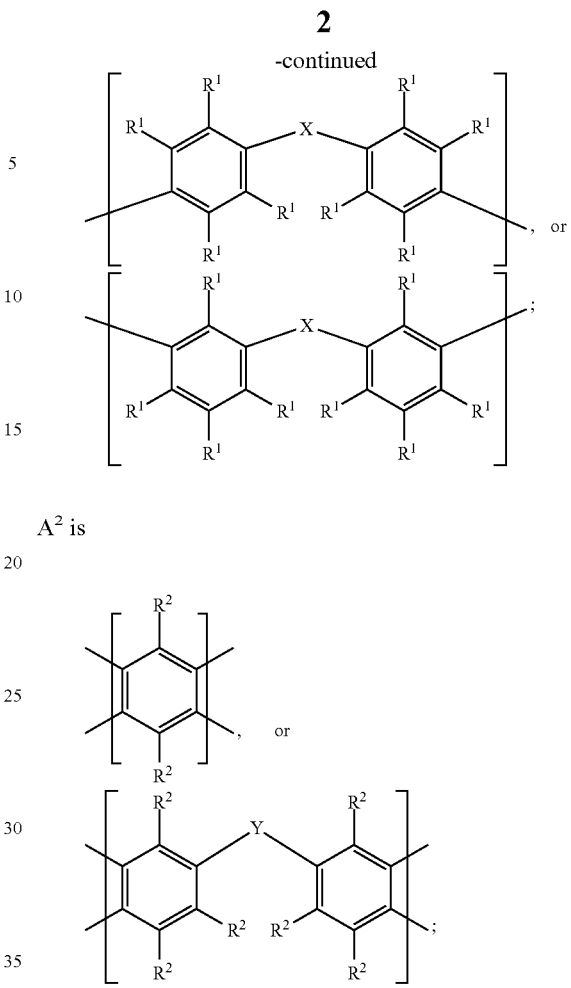

$R^1$ and $R^2$ are independently —H, —$CF_3$, —OH, —Br, —Cl, —F, $C_{1-6}$ alkyl group, or $C_{1-6}$ alkoxy group; and X and Y are independently single bond, —O—, —$CH_2$—, —$C(CH_3)_2$—, or —NH—. The second selective layer includes an interfacial polymer.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

The disclosure discloses a filtration material including a supporting layer; a first selective layer disposed on the supporting layer; and a second selective layer disposed on the first selective layer. The first selective layer consists of a polyimide with a specific structure and an ionic polymer intertwined with the polyimide, and the second selective layer includes interfacial polymer. Due to the ionic bonds between the ionic polymer and the interfacial polymer, the self-shrinkage of fibers of the filtration material can be achieved, resulting in reducing the pore size of the filtration material. Therefore, the filtration material of the disclosure can have a superior thermal resistance, a high water flux, and a high ion rejection rate under a relatively low pressure, and can serve as a ultrafiltration membrane, a desalination membrane, a nanofiltration membrane, a reverse osmosis membrane, or a forward osmosis membrane, and be applied to desalination, seawater treatment, ultrapure water treatment, water softening, or precious metals recovery.

Figure 1:
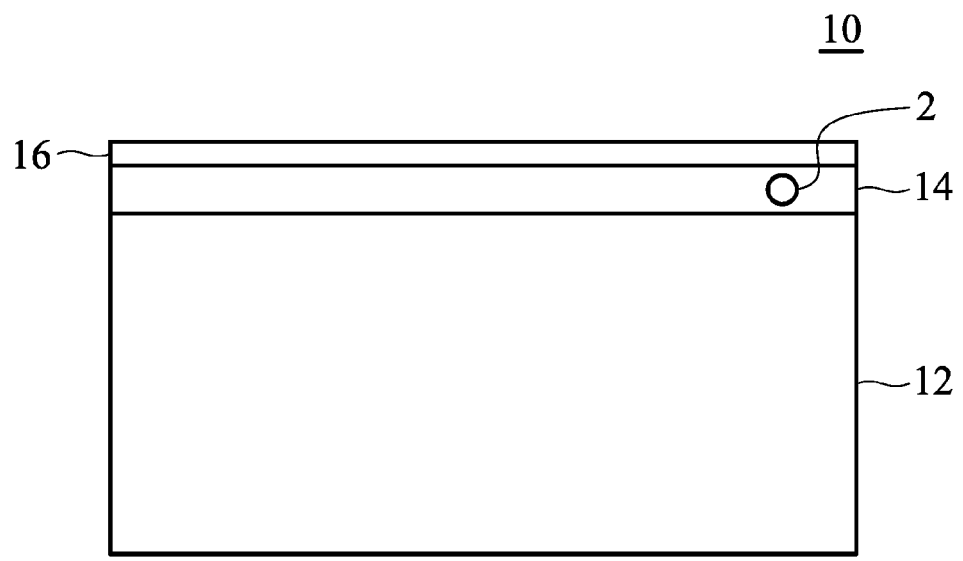
FIG. 1 is a cross-sectional view of the filtration material according to an embodiment of the disclosure.

According to an embodiment of the disclosure, referring to FIG. 1, the filtration material 10 can include a supporting layer 12, a first selective layer 14 disposed on the supporting layer 12, and a second selective layer 16 disposed on the first selective layer 14. According to another embodiment of the disclosure, the supporting layer can have a thickness between about 1 μm and 500 μm, and the material of the supporting layer can be cellulose ester, polysulfone, polypropylene (PP), polyetheretherketone (PEK), polyester (PET), polyimide (PI), polyurethane (PU), chlorinated polyvinyl chloride (PVC), styrene acrylonitrile (AN), glass fiber, inorganic fiber, metal fiber, or a combination thereof. According to embodiments of the disclosure, the supporting layer of the disclosure can be a non-woven fabric fiber supporting layer, wherein the fibers of the non-woven fabric fiber supporting layer have a diameter between about 0.5 μm and 50 μm.

Figure 2:
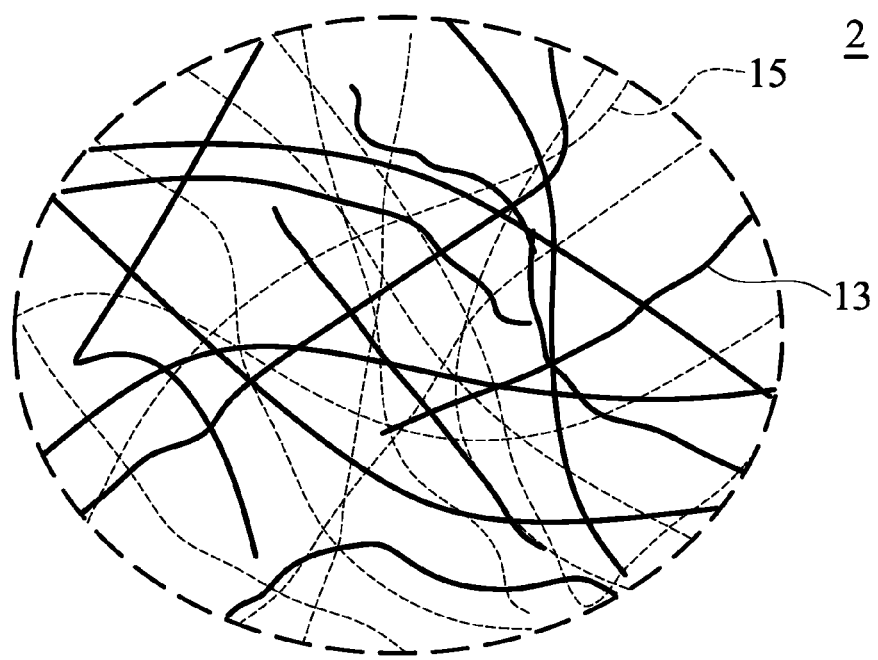
FIG. 2 is a close-up diagram of region 2 of the first selective layer of the filtration material shown in FIG. 1.

According to embodiments of the disclosure, the first selective layer of the disclosure can have a thickness between about 1 μm and 30 μm. FIG. 2 is a close-up diagram of region 2 of the first selective layer 14 of the filtration material shown in FIG. 1. As shown in FIG. 2, the first selective layer 14 includes a polyimide 13 and an ionic polymer 15, wherein the polyimide 13 and the ionic polymer 15 are intertwined with each other. In particular, in the first selective layer 14, the weight ratio between the polyimide and the ionic polymer is from about 1:99 to 99:1, such as from about 1:9 to 9:1.

The first selective layer can consist of a polyimide and an ionic polymer intertwined with the polyimide. It should be noted that, in order to improve the thermal resistance, water flux, and ion rejection rate of the filtration material under a relatively low pressure, the polyimide can include at least one repeat unit having a structure represented by Formula (I)

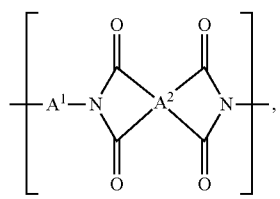

Formula (I)

wherein $A^1$ is

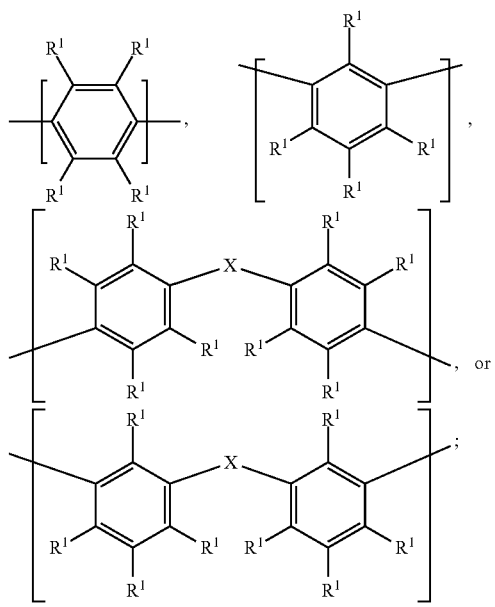

$A^2$ is

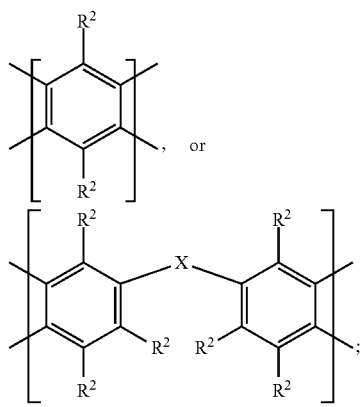

$R^1$ and $R^2$ are independently —H, —CF$_3$, —OH, C$_{1-6}$ alkyl group, or C$_{1-6}$ alkoxy group; and X and Y are independently single bond, —O—, —CH$_2$—, —C(CH$_3$)$_2$—, or —NH—. For example, the repeat unit having a structure represented by Formula (I) can be

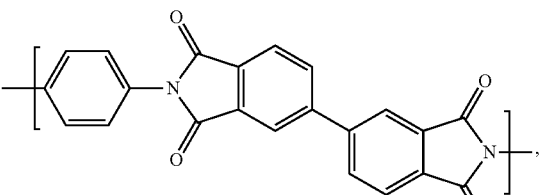

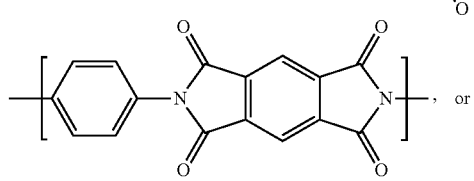

-continued

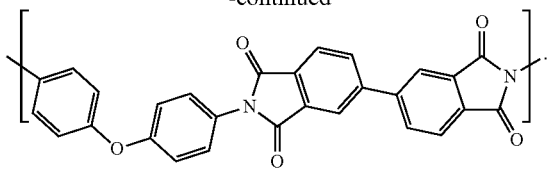

According to embodiments of the disclosure, the polyimide of the disclosure can be polyimide modified by silica. For example, the polyimide modified by silica can be a reaction product of a composition. The composition can include a polyimide, a solvent, and a polar aprotic solution including a surface-hydroxyl-containing nanoscale silicon dioxide modified by a surface modifier. The polyimide can include at least one repeat unit having a structure represented by Formula (I). The surface modifier can have a structure represented by Formula (II):

$$R^6—Si—(OR^7)_3, \quad \text{Formula (II)}$$

wherein $R^6$ can be aliphatic group or aryl group, and $R^7$ can be a $C_{1-8}$ alkyl group. In the invention, an "aliphatic group" is a non-aromatic moiety that may contain any combination of carbon atoms, hydrogen atoms, halogen atoms, oxygen, nitrogen or other atoms, and optionally contain one or more units of unsaturation, e.g., double and/or triple bonds. An "aryl group" refers to a mono- or polycyclic carbocyclic ring system having one or more aromatic rings including, but not limited to, phenyl, tolyl, naphthyl, tetrahydronaphthyl, biphenyl, phenanthryl, anthracyl, and the like. The aryl group can include a "heteroaryl group" (mono- or polycyclic), containing one or two ring atoms which are additional heteroatoms independently selected from, for example, S, O and N, such as pyridyl, furyl, thienyl, imidazolyl, and the like. In embodiments of the invention, $R^6$ can be a $C_{1-18}$ alkyl group, $C_{2-18}$ alkynylene group, $C_{2-18}$ alkenyl group, $C_{1-18}$ alkoxy group, $C_{2-18}$ ether group, $C_{1-18}$ alkylamino group, $C_{1-18}$ alkylthio group, $C_{2-18}$ isocyanate group, $C_{3-18}$ heteroalkyl group, $C_{6-20}$ aryl group, $C_{3-20}$ heteroaryl group, $C_{3-20}$ cycloaliphatic group, or $C_{3-20}$ cycloalkyl group. The surface modifier of the disclosure can be, but is not limited to, propyltrimethoxysilane, propyltriethoxysilane, isobutyltrimethoxysilane, isobutyltriethoxysilane, octyltrimethoxysilane, octyltriethoxysilane, octadecyltrimethoxysilane, octadecyltriethoxysilane, N-phenyl-3-aminopropyltrimethoxysilane, phenyltrimethoxysilane, phenyltriethoxysilane, trimethoxysilylethylene, triethoxysilylethylene, allyltrimethoxysilane, allyltriethoxysilane, 3-glycidoxypropyltrimethoxysilane, 3-glycidoxypropyltriethoxysilane, 3-aminopropyltrimethoxysilane, 3-aminopropyltrimethoxysilane, aminoethylaminopropyltrimethoxysilane, aminoethylaminopropyltriethoxysilane, 3-isocyanatepropyltrimethoxysilane or 3-isocyanatepropyltriethoxysilane. The polyamic acid resin composition can include a polar aprotic solvent such as N-methyl-2-pyrrolidone, N,N-dimethylacetamide, γ-butyrolactone, or a combination thereof. Furthermore, a polyamic acid resin composition can include a co-solvent such as a co-solvent including xylene and toluene.

According to embodiments of the disclosure, the ionic polymer includes a repeat unit of

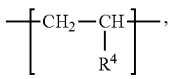

a repeat unit of

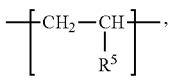

and a repeat unit of

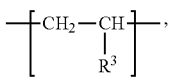

wherein $R^3$ is benzenesulfonic acid group or alkylsulfonic acid group; $R^4$ is

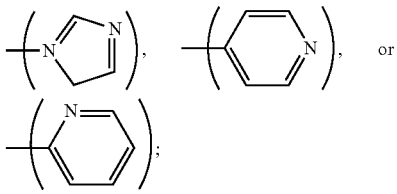

and $R^5$ is phenyl or methoxycarbonyl. The repeat unit of

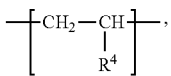

the repeat unit of

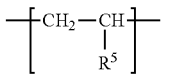

and the repeat unit of

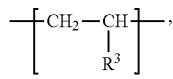

are arranged in an irregular or intermittent order. According to some embodiments of the disclosure, the ionic polymer has an average molecular weight (such as number-average molecular weight (Mn)) between 300 and 1,000,000.

On the other hand, in order to achieve the self-shrinkage of fibers of the first selective layer 14 consisting of the polyimide and the ionic polymer, the second selective layer can be an interfacial polymer. The second selective layer of the disclosure can have a thickness between about 50 nm and 300 nm. The interfacial polymer of the disclosure is prepared by reacting a diamine compound with an acyl chloride compound via polymerization. In particular, the diamine compound can be 1,3,5-triaminobenzene, p-phenylene diamine, m-phenylene diamine, 1,4-diaminocyclohexane, 1,2-diaminocyclohexane, N,N-diphenylethylene diamine, piperazine, trimethylene dipiperidine, m-xylene diamine, 5-methylnonane-1,9-diamine, carbonyl diamine, 2,2-ethylenedioxy bisethylamine, or a combination thereof. The acyl chloride compound can be trimesoyl chloride (TMC), terephthalloyl chloride (TPC), or a combination thereof. According to some embodiments of the disclosure, when the interfacial polymer is prepared by reacting m-phenylene diamine with trimesoyl chloride, or prepared by reacting 1,4-diaminocyclohexane with trimesoyl chloride, the filtration material exhibits increased water flux and rejection rate for filtrating the solution under high temperature.

Figure 3:
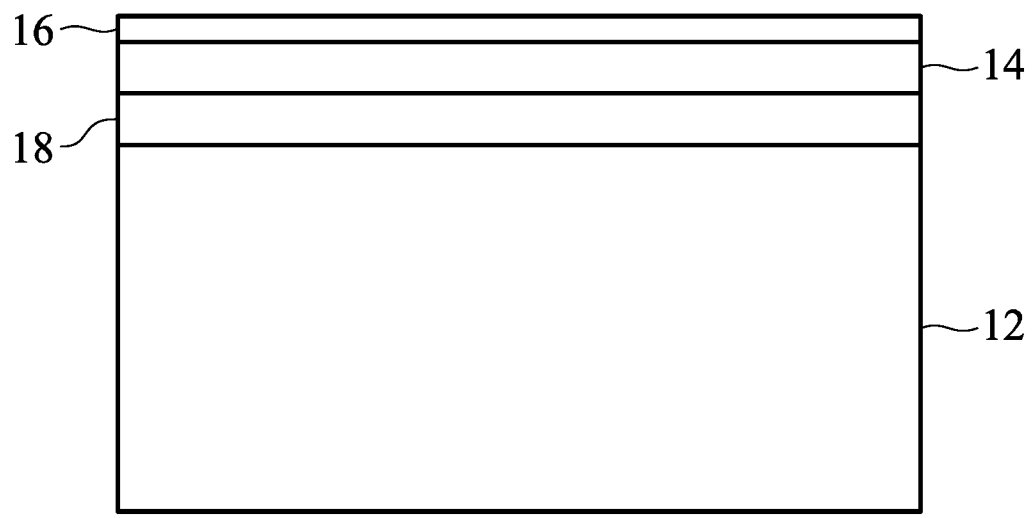
FIG. 3 is a cross-sectional view of the filtration material according to another embodiment of the disclosure.

According to another embodiment of the disclosure, the filtration material of the disclosure can further include a polymer fiber layer disposed between the first selective layer and the supporting layer. As show in FIG. 3, the filtration material 10 can include a supporting layer 12, a first selective layer 14 disposed on the supporting layer 12, a second selective layer 16 disposed on the first selective layer 14, and a polymer fiber layer 18 disposed between the first selective layer 14 and the supporting layer 12. The polymer fiber layer of the disclosure can have a thickness between 0.5 μm and 20 μm. The polymer fiber layer 18 can have a fiber diameter between 2 nm and 800 nm. The polymer fiber layer can be polyurethane (PU), polyvinyl alcohol (PVA), polyacrylonitrile (PAN), polyethersulfone (PES), polyvinglidene fluoride (PVDF), polyolefin, polysulfone, polyester, polyamide, polycarbonate, polystyrene, polyacrylamide, polyacrylate, polymethyl methacrylate, polysaccharide, or a combination thereof.

The method for fabricating the filtration material of the disclosure can include the following steps. First, a supporting layer is provided. Next, the polymer fiber layer and the first selective layer are formed on the supporting layer, wherein the supporting layer, the polymer fiber layer, and/or the first selective layer can be formed by solution spinning, or electrospinning.

Next, the first selective layer is bathed in a first solution and a second solution subsequently, forcing a second selective layer formed on the surface of the first selective layer bathed in the first solution and second solution to via interfacial polymerization. In particular, the first solution includes a diamine compound and the second solution includes an acyl chloride compound, and the interfacial polymer is prepared by reacting the diamine compound and the acyl chloride compound via polymerization.

The method for preparing the first solution includes dissolving a diamine compound into water, wherein the concentration of the diamine compound is about 0.1-30 wt %, based on the weight of the first solution. The first solution can include a methanol, ethanol, isopropanol, or n-butanol. Furthermore, the method for preparing the second solution includes dissolving an acyl chloride compound into an organic solvent, wherein the concentration of the acyl chloride compound is about 0.1-1 wt %, based on the weight of the second solution. The organic solvent can be hexane, 1,1,2-trichloro-1,2,2-trifluoroethane, pentane, or heptane.

Below, exemplary embodiments will be described in detail so as to be easily realized by a person having ordinary knowledge in the art. The disclosure concept may be embodied in various forms without being limited to the exemplary embodiments set forth herein. Descriptions of well-known parts are omitted for clarity.

Preparation of Polyimide

Preparation Example 1

16.53 g (0.153 mol) of p-Phenylenediamine (PPD) was dissolved in 246.13 g of N,N-dimethyl-acetamide (DMAc), obtaining a p-phenylenediamine (PPD) solution. 45 g (0.153 mol) of 3,3',4,4'-biphenyltetracarboxylic dianhydride (BPDA) was added to the p-phenylenediamine (PPD) solution in three separate batches with an interval of 30 minutes. After the addition of BPDA was complete, the mixture was stirred for 8 hours, and then 102.54 g of DMAc was added into the mixture, obtaining Polyamic acid solution (1) (with a solid content of 15%, and a viscosity between 5,000 cps and 100,000 cps). The synthesis pathway of the above reaction was as follows:

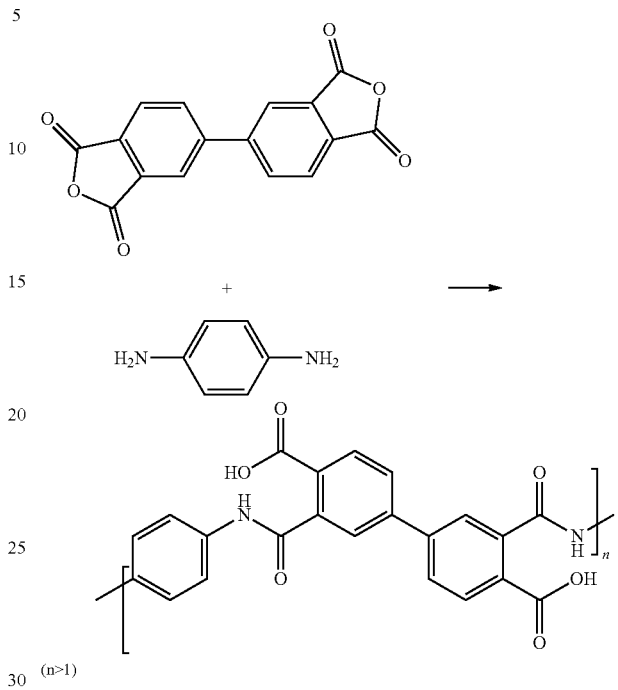

Next, 100 g of Polyamic acid solution (1) was dissolved in 275 g DMAc such that Polyamic acid solution (1) had a solid content of 4%. Next, Polyamic acid solution (1) was baked at 50° C., 150° C., 210° C., and 400° C. each for 30 minutes), obtaining Polyimide (P1) by cyclodehydrating the polyamic acid. The synthesis pathway of the above reaction was as follows:

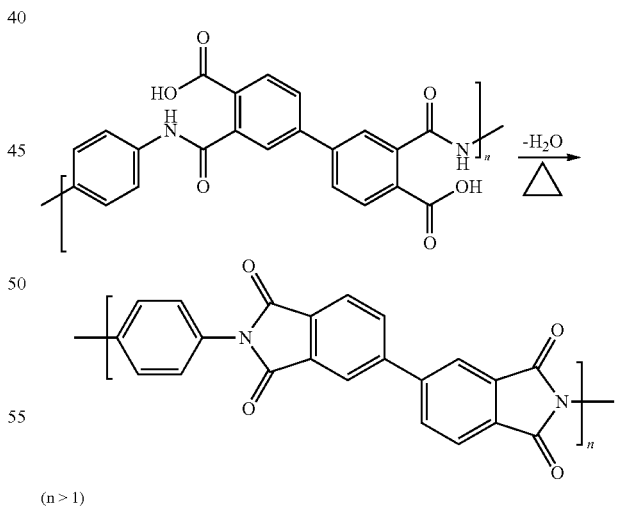

The thermal degradation temperature (Td) determined by thermogravimetric analysis (TGA) apparatus of Polyimide (P1) was 614.19° C.

Preparation Example 2

30.63 g (0.153 mol) of 4,4'-oxydianiline (ODA) was dissolved in 302.52 g of N,N-dimethyl-acetamide (DMAc), obtaining a 4,4'-oxydianiline (ODA) solution. 45 g (0.153 mol) of 3,3',4,4'-biphenyltetracarboxylic dianhydride (BPDA) was added to the 4,4'-oxydianiline (ODA) solution in three separate batches with an interval of 30 minutes. After the addition of BPDA was complete, the mixture was stirred for 8 hours, and then 126.05 g of DMAc was added into the mixture, obtaining Polyamic acid solution (2) (with a solid content of 15%, and a viscosity between 5,000 cps and 100,000 cps). The synthesis pathway of the above reaction was as follows:

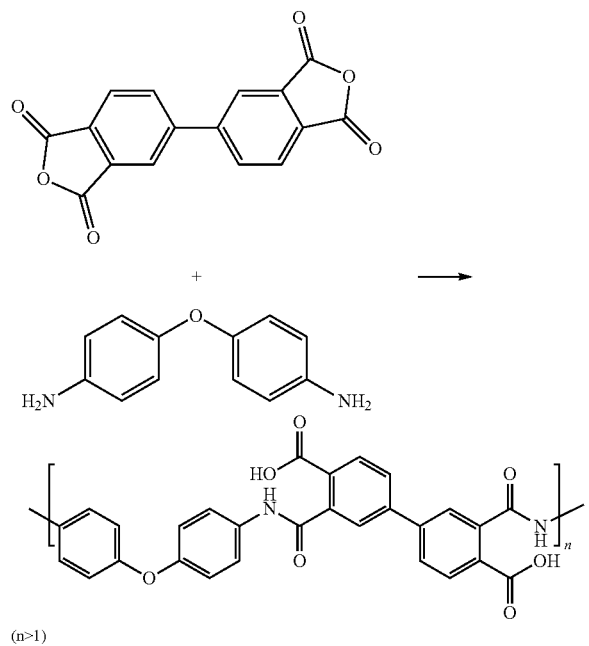

Next, 100 g of Polyamic acid solution (2) was dissolved in 275 g DMAc such that Polyamic acid solution (2) had a solid content of 4%. Next, Polyamic acid solution (2) was baked at 50° C., 150° C., 210° C., and 400° C. each for 30 minutes), obtaining Polyimide (P2) by cyclodehydrating the polyamic acid. The synthesis pathway of the above reaction was as follows:

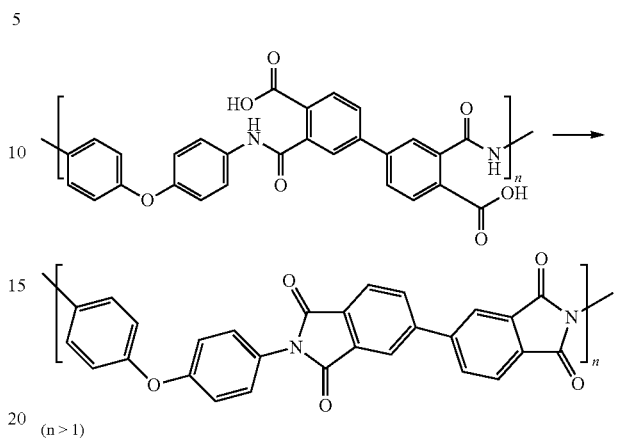

The thermal degradation temperature (Td) determined by thermogravimetric analysis (TGA) apparatus of Polyimide (P2) was 576.67° C.

Preparation Example 3

16.53 g (0.153 mol) of p-phenylenediamine (PPD) was dissolved in 236.72 g of N,N-dimethyl-acetamide (DMAc), obtaining a p-phenylenediamine (PPD) solution. 35.98 g (0.122 mol) of 3,3',4,4'-Biphenyltetracarboxylic dianhydride (BPDA) and 6.67 g (0.03 mol) of pyromellitic dianhydride (PMDA) were added to the p-phenylenediamine (PPD) solution in three separate batches with an interval of 30 minutes. After the addition of BPDA and PMDA was complete, the mixture was stirred for 8 hours, and then 98.63 g of DMAc was added into the mixture, obtaining Polyamic acid solution (3) (with a solid content of 15%, and a viscosity between 5,000 cps and 100,000 cps). The synthesis pathway of the above reaction was as follows:

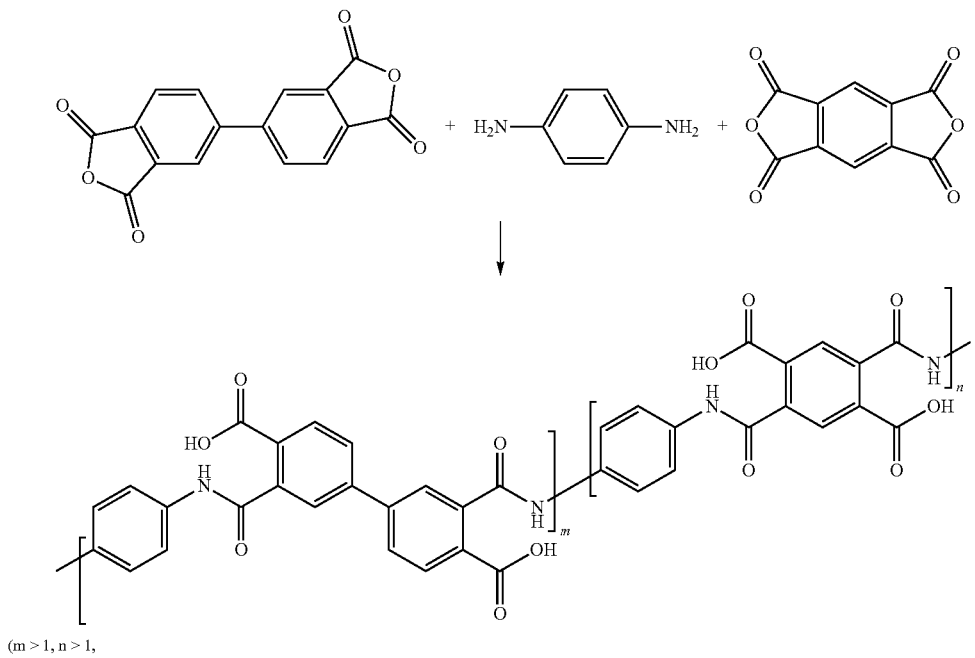

the repeating units are arranged in a random fashion)

Next, 100 g of Polyamic acid solution (3) was dissolved in 275 g DMAc such that Polyamic acid solution (3) had a solid content of 4%. Next, Polyamic acid solution (3) was baked at 50° C., 150° C., 210° C., and 400° C. each for 30 minutes), obtaining Polyimide (P3) by cyclodehydrating the polyamic acid. The synthesis pathway of the above reaction was as follows:

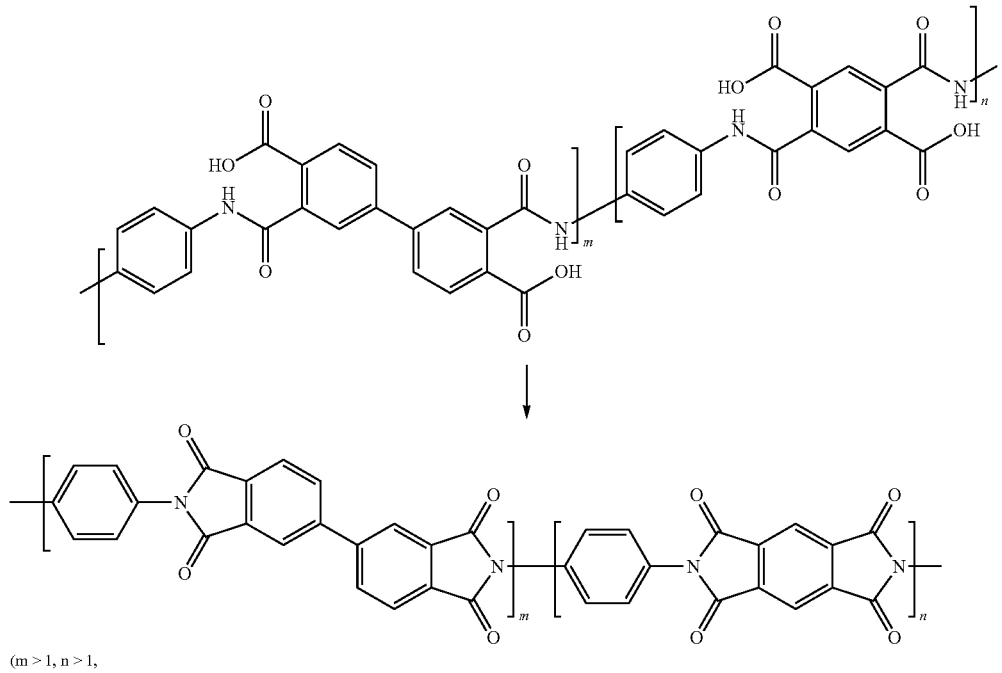

(m > 1, n > 1, the repeating units are arranged in a random fashion)

The thermal degradation temperature (Td) determined by thermogravimetric analysis (TGA) apparatus of Polyimide (P3) was 601.59° C.

Preparation of Polyimide Modified by Silica

Preparation Example 4

100 g of iso-propanol sol of nanoscale silica having surface hydroxyl groups (sold and fabricated by Echochemical) (with a solid content of 20%), 1 g of N-phenyl-3-aminopropyltrimethoxysilane (serving as surface modification agent), and 80 g of DMAc were added into a 500 ml reaction bottle. After stirring at 40° C. for 6 hrs, iso-propanol and water (side-product) were removed using a vacuum distillation process and then 80 g of DMAc was added into the reaction bottle, obtaining a DMAc solution containing nanoscale silica, with surface hydroxyl groups, modified by the surface modification agent (with a solid content of 20%). After measurement using a dynamic light scattering method, an average silica particle size of 20 nm was recorded for the DMAc solution. Next, the DMAc solution was added into Polyamic acid solution (2) of Preparation Example 2, wherein the weight ratio between the nanoscale silica, with surface hydroxyl groups, modified by the surface modification agent of the DMAc solution and the solid content of Polyamic acid solution (2) is 1:9. Next, the mixture was baked at 50° C., 150° C., 210° C., and 400° C. each for 30 minutes), obtaining a polyimide modified by silica.

Preparation of Ionic Polymer

Preparation Example 5

10 g of sodium styrenesulfate, 40 g of 4-vinyl pyridine, 7 g of styrene, 50 g of deionized water and 50 g of isopropanol (IPA) were added into a reaction bottle, and stirred under $N_2$ atmosphere at 70° C. A solution containing 0.2 g of potassium persulfate (KPS) in 10 mL of the deionized water was slowly added into the reaction bottle, and left to stand for 3 hours. The mixture was purified to obtain the ionic polymer (polyE) with a yield of 88% and an average molecular weight of 136,784.

Preparation of Filtration Material

Example 1

Polyimide (P1) of Preparation Example 1 and the ionic polymer (polyE) of preparation Example 5 were mixed and dissolved in N,N-dimethyl-acetamide (DMAc) to provide a spinning solution, wherein the weight ratio of Polyimide (P1) and polyE was 3:7. Next, a selective layer (with a thickness of about 10 μm) was formed on a supporting layer (PET non-woven fabric fiber supporting layer, with a thickness of 110 μm) by electrospinning the spinning solution. Next, the selective layer was bathed in an aqueous phase (piperazine/water with a weight ratio of 2/98) for 3 minutes. Next, the excess water of the selective layer was removed. Next, the selective layer was bathed in an organic solution (trimesoyl chloride (TMC)/hexane with a weight ratio of 0.1/100) for 30 seconds. Next, the above material was placed in an oven at 70° C. for 10 minutes, resulting in the formation of the interfacial polymer. Thus, the filtration material (1) was obtained.

Example 2

Example 2 was performed in the same way as in Example 1 except that the weight ratio of Polyimide (P1) and polyE was changed from 3:7 to 7:3, obtaining the filtration material (2).

Example 3

The polyimide modified by silica of Preparation Example 4 and the ionic polymer (polyE) of preparation Example 5 were mixed and dissolved in N,N-dimethyl-acetamide (DMAc) to provide a spinning solution, wherein the weight ratio of the polyimide modified by silica and polyE was 3:7. Next, a selective layer (with a thickness of about 10 μm) was formed on a supporting layer (PET non-woven fabric fiber supporting layer, with a thickness of 110 μm) by electrospinning the spinning solution. Next, the selective layer was bathed in an aqueous phase (piperazine/water with a weight ratio of 2/98) for 3 minutes. Next, the excess water of the selective layer was removed. Next, the selective layer was bathed in an organic solution (trimesoyl chloride (TMC)/hexane with a weight ratio of 0.1/100) for 30 seconds. Next, the above material was placed in an oven at 70° C. for 10 minutes, resulting in the formation of the interfacial polymer. Thus, the filtration material (3) was obtained.

Comparative Example 1

Polyimide (PI) (commercially available from GE Plasctics with a trade No. of Ultem) was dissolved in N,N-dimethyl-acetamide (DMAc) to provide a spinning solution. Next, a selective layer (with a thickness 10 μm) was formed on a supporting layer (PET non-woven fabric fiber supporting layer, with a thickness of 110 μm) by electrospinning the spinning solution. Next, the selective layer was bathed in an aqueous phase (piperazine/water with a weight ratio of 2/98) for 3 minutes. Next, the excess water of the selective layer was removed. Next, the selective layer was bathed in an organic solution (trimesoyl chloride (TMC)/hexane with a weight ratio of 0.1/100) for 30 seconds. Next, the above material was placed in an oven at 70° C. for 10 minutes, resulting in the formation of the interfacial polymer. Thus, the filtration material (4) was obtained.

Comparative Example 2

Polyimide (PI) (commercially available from GE Plasctics with a trade No. of Ultem) and the ionic polymer (polyE) of preparation Example 5 were mixed and dissolved in N,N-dimethyl-acetamide (DMAc) to provide a spinning solution, wherein the weight ratio of polyimide (PI) and polyE was 3:7. Next, a selective layer (with a thickness of about 10 μm) was formed on a supporting layer (PET non-woven fabric fiber supporting layer, with a thickness of 110 μm) by electrospinning the spinning solution. Next, the selective layer was bathed in an aqueous phase (piperazine/water with a weight ratio of 2/98) for 3 minutes. Next, the excess water of the selective layer was removed. Next, the selective layer was bathed in an organic solution (trimesoyl chloride (TMC)/hexane with a weight ratio of 0.1/100) for 30 seconds. Next, the above material was placed in an oven at 70° C. for 10 minutes, resulting in the formation of the interfacial polymer. Thus, the filtration material (5) was obtained.

Comparative Example 3

Polyimide (P1) of Preparation Example 1 was dissolved in N,N-dimethyl-acetamide (DMAc) to provide a spinning solution. Next, a selective layer (with a thickness of about 10 μm) was formed on a supporting layer (PET non-woven fabric fiber supporting layer, with a thickness of 110 μm) by electrospinning the spinning solution. Next, the selective layer was bathed in an aqueous phase (piperazine/water with a weight ratio of 2/98) for 3 minutes. Next, the excess water of the selective layer was removed. Next, the selective layer was bathed in an organic solution (trimesoyl chloride (TMC)/hexane with a weight ratio of 0.1/100) for 30 seconds. Next, the above material was placed in an oven at 70° C. for 10 minutes, resulting in the formation of the interfacial polymer. Thus, the filtration material (6) was obtained.

Comparative Example 4

Polyacrylonitrile (PAN) (commercially available from Tong-Hwa Synthetic Fiber Co. Ltd., having an average molecular weight of 240000 g/mol) and the ionic polymer (polyE) of preparation Example 5 were mixed and dissolved in N,N-dimethyl-acetamide (DMAc) to provide a spinning solution, wherein the weight ratio of polyacrylonitrile (PAN) and polyE was 3:7. Next, a selective layer (with a thickness of about 10 μm) was formed on a supporting layer (PET non-woven fabric fiber supporting layer, with a thickness of 110 μm) by electrospinning the spinning solution. Next, the selective layer was bathed in an aqueous phase (piperazine/water with a weight ratio of 2/98) for 3 minutes. Next, the excess water of the selective layer was removed. Next, the selective layer was bathed in an organic solution (trimesoyl chloride (TMC)/hexane with a weight ratio of 0.1/100) for 30 seconds. Next, the above material was placed in an oven at 70° C. for 10 minutes, resulting in the formation of the interfacial polymer. Thus, the filtration material (7) was obtained.

Comparative Example 5

The ionic polymer (Poly E) was dissolved in N,N-dimethyl-acetamide (DMAc) to provide a spinning solution. Next, a selective layer (with a thickness of about 10 μm) was formed on a supporting layer (PET non-woven fabric fiber supporting layer, with a thickness of 110 μm) by electrospinning the spinning solution. Next, the selective layer was bathed in an aqueous phase (piperazine/water with a weight ratio of 2/98) for 3 minutes. Next, the excess water of the selective layer was removed. Next, the selective layer was bathed in an organic solution (trimesoyl chloride (TMC)/hexane with a weight ratio of 0.1/100) for 30 seconds. Next, the above material was placed in an oven at 70° C. for 10 minutes, resulting in the formation of the interfacial polymer. Thus, the filtration material (8) was obtained.

Characteristics of Filtration Materials

Example 4

Desalination tests were conducted under 1000 ppm of sodium sulfate ($Na_2SO_4$) at 100 psi and room temperature (or 90° C.) to measure the desalination efficiency and the flux of the filtration materials (1)-(8), and the result was shown in Table 1.

TABLE 1

| | | room temperature | | 90° C. | |
| --- | --- | --- | --- | --- | --- |
| | selective layer | desalination efficiency (%) | flux (LMH) | desalination efficiency (%) | flux (LMH) |
| filtration material (1) | polyimide (P1) (Preparation Example 1)/ Poly E (3:7) | 97 | 37 | 97 | 186 |
| filtration material (2) | polyimide (P1) (Preparation | 96 | 39 | 96 | 189 |

TABLE 1-continued

| | | room temperature | | 90° C. | |
|---|---|---|---|---|---|
| | selective layer | desalination efficiency (%) | flux (LMH) | desalination efficiency (%) | flux (LMH) |
| filtration material (3) | Example 1)/Poly E (7:3) polyimide modified by silica/Poly E (3:7) | 94 | 40 | 95 | 146 |
| filtration material (4) | PI | 80 | 35 | 83 | 2 |
| filtration material (5) | PI/Poly-E (3:7) | 95 | 37 | 97 | 39 |
| filtration material (6) | polyimide (P1) (Preparation Example 1) | 81 | 17 | 83 | 183 |
| filtration material (7) | PAN/Poly-E (3:7) | 97 | 60 | 96 | 6 |
| filtration material (8) | Poly-E | 96 | 37 | 97 | 30 |

As shown in Table 1, the selective layer fabricated by conventional polyimide and polyE exhibits a low flux when filtrating the sodium sulfate solution under a high temperature. Furthermore, the filtration materials (1)-(3) of the disclosure exhibit a high desalination efficiency (larger than or equal to about 94%) and a high water flux (larger than about 140 LMH) when filtrating the sodium sulfate solution under high temperature (such as 90° C.).

The first selective layer of the filtration material of the disclosure consists of the polyimide with a specific structure and the ionic polymer intertwined with the polyimide, and the second selective layer includes interfacial polymer. Due to the ionic bonds between the ionic polymer and the interfacial polymer, the self-shrinkage of fibers of the filtration material can be achieved, resulting in reducing the pore size of the filtration material. Therefore, the filtration material of the disclosure can have a superior thermal resistance, a high water flux, and a high ion rejection rate under a relatively low pressure, and can serve as a ultrafiltration membrane, a desalination membrane, a nanofiltration membrane, a reverse osmosis membrane, or a forward osmosis membrane, and be applied to desalination process, seawater treatment, ultrapure water treatment, water softening, or precious metals recovery.

It will be clear that various modifications and variations can be made to the disclosed methods and materials. It is intended that the specification and examples be considered as exemplary only, with the true scope of the disclosure being indicated by the following claims and their equivalents.

What is claimed is:

1. A filtration material, comprising:
   a supporting layer;
   a first selective layer disposed on the supporting layer, wherein the first selective layer consists of a polyimide and an ionic polymer intertwined with the polyimide, wherein the polyimide includes at least one repeat unit having a structure represented by Formula (I)

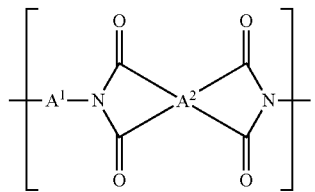

Formula (I)

wherein, $A^1$ is

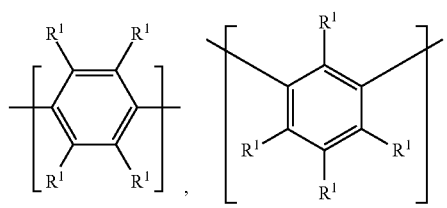

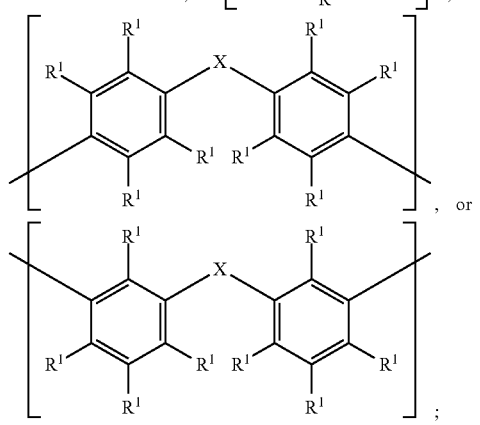

$A^2$ is

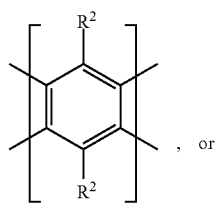

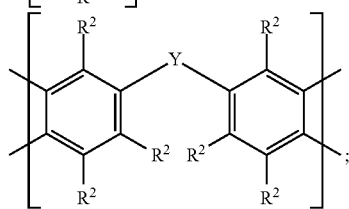

$R^1$ and $R^2$ are independently —H, —$CF_3$, —OH, —Br, —Cl, —F, $C_{1-6}$ alkyl group, or $C_{1-6}$ alkoxy group; and X and Y are independently single bond, —O—, —$CH_2$—, —$C(CH_3)_2$—, or —NH—; and
   a second selective layer disposed on the first selective layer, wherein the second selective layer comprises an interfacial polymer.

2. The filtration material as claimed in claim 1, wherein the supporting layer comprises cellulose ester, polysulfone, polypropylene, polyetheretherketone, polyester, polyimide, polyurethane, chlorinated polyvinyl chloride, styrene acrylonitrile, glass fiber, inorganic fiber, metal fiber, or a combination thereof.

3. The filtration material as claimed in claim 1, wherein the supporting layer comprises a non-woven fabric fiber supporting layer.

4. The filtration material as claimed in claim 3, wherein fibers of the non-woven fabric fiber supporting layer have a diameter between 500 nm and 50 μm.

5. The filtration material as claimed in claim 1, wherein the ionic polymer a repeat unit of $$\left[\begin{array}{c}CH_2-CH\\|\\R^3\end{array}\right],$$

a repeat unit of $$\left[\begin{array}{c}CH_2-CH\\|\\R^4\end{array}\right],$$

and a repeat unit of $$\left[\begin{array}{c}CH_2-CH\\|\\R^5\end{array}\right],$$

wherein the repeat unit of $$\left[\begin{array}{c}CH_2-CH\\|\\R^3\end{array}\right],$$

the repeat unit of $$\left[\begin{array}{c}CH_2-CH\\|\\R^4\end{array}\right],$$

and the repeat unit of $$\left[\begin{array}{c}CH_2-CH\\|\\R^5\end{array}\right]$$

are arranged in an irregular or intermittent order; $R^3$ is benzenesulfonic acid group or alkylsulfonic acid group; $R^4$ is

[imidazole], [pyridine], or [pyridine];

and $R^5$ is phenyl or methoxycarbonyl.

6. The filtration material as claimed in claim 1, wherein the ionic polymer has an average molecular weight between 300 and 1,000,000.

7. The filtration material as claimed in claim 1, wherein the interfacial polymer is prepared by reacting a diamine compound with an acyl chloride compound via polymerization.

8. The filtration material as claimed in claim 7, wherein the diamine compound comprises 1,3,5-triaminobenzene, p-phenylene diamine, m-phenylene diamine, 1,4-diaminocyclohexane, 1,2-diaminocyclohexane, N,N-diphenylethylene diamine, piperazine, trimethylene dipiperidine, m-xylene diamine, 5-methylnonane-1,9-diamine, carbonyl diamine, 2,2-ethylenedioxy bisethylamine, or a combination thereof.

9. The filtration material as claimed in claim 7, wherein acyl chloride compound comprises trimesoyl chloride, terephthalloyl chloride, or a combination thereof.

10. The filtration material as claimed in claim 1, wherein the weight ratio of the ionic polymer and the polyimide is between 1:99 and 99:1.

11. The filtration material as claimed in claim 1, wherein the first selective layer has a thickness between 1 μm and 30 μm.

12. The filtration material as claimed in claim 1, wherein the second selective layer has a thickness between 50 nm and 300 nm.

13. The filtration material as claimed in claim 1, further comprising:
a polymer fiber layer disposed between the first selective layer and the supporting layer.

14. The filtration material as claimed in claim 13, wherein the polymer fiber layer has a thickness between 0.5 μm and 20 μm.

15. The filtration material as claimed in claim 1, wherein the polyimide is polyimide modified by silica.

16. The filtration material as claimed in claim 1, wherein the polyimide has at least one of a repeat unit of a repeat unit of

[structure of polyimide repeat unit with two phenyl-N-phthalimide groups connected], a repeat unit of

[structure of polyimide repeat unit with phenyl group connected to pyromellitimide], and a repeat unit of
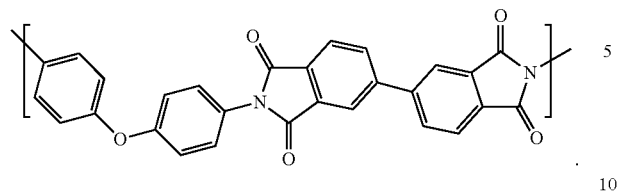
* * * * *